is(12) United States Patent
Chiu et al.

(10) Patent No.: US 9,582,113 B2
(45) Date of Patent: Feb. 28, 2017

(54) METHOD AND APPARATUS FOR IMPROVING COORDINATE ACCURACY OF A TOUCH PANEL

(71) Applicant: EverDisplay Optronics (Shanghai) Limited, Shanghai (CN)

(72) Inventors: Changming Chiu, Shanghai (CN); Hsiao-Yi Lin, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 173 days.

(21) Appl. No.: 14/593,493

(22) Filed: Jan. 9, 2015

(65) Prior Publication Data

US 2015/0199069 A1    Jul. 16, 2015

(30) Foreign Application Priority Data

Jan. 13, 2014    (CN) .......................... 2014 1 0015001

(51) Int. Cl.
*G06F 3/041*    (2006.01)
(52) U.S. Cl.
CPC .................................. *G06F 3/0418* (2013.01)
(58) Field of Classification Search
CPC ....................................................... G06F 3/0418
See application file for complete search history.

(56) References Cited

U.S. PATENT DOCUMENTS

| | | | | |
|---|---|---|---|---|
| 8,593,431 B1 * | 11/2013 | Karpin | .................... | G06F 3/045 345/173 |
| 2014/0184561 A1 * | 7/2014 | Kim | ........................ | G06F 3/044 345/174 |

FOREIGN PATENT DOCUMENTS

| | | |
|---|---|---|
| CN | 101882041 B | 9/2013 |
| JP | 2008-52729 A | 3/2008 |
| JP | 2011-48663 A | 3/2011 |
| TW | 201218028 A | 5/2012 |
| TW | 201218055 A | 5/2012 |

OTHER PUBLICATIONS

Office Action issued Jul. 23, 2015 by the TW Office.
Office Action issued Sep. 1, 2015 by the JP Office.

* cited by examiner

*Primary Examiner* — Kent Chang
*Assistant Examiner* — Scott Au
(74) *Attorney, Agent, or Firm* — Yunling Ren (57) ABSTRACT

A method for improving coordinate accuracy of a touch panel having sensing lines arranged to form an array includes the steps of: detecting existence of a touch point influencing at least one sensing line; determining existence of an edge sensing line; providing signal strengths to the at least one sensing line and a sensing line immediately adjacent to the at least one sensing line; generating a virtual sensing line extending out the touch panel and immediately adjacent to the at least one sensing line; providing a signal strength to the virtual sensing line; and obtaining actual coordinate of the touch point by weighing coordinates of the at least one sensing line, the sensing line immediately adjacent to the at least one sensing line and the virtual sensing line via system generated coordinates.

17 Claims, 5 Drawing Sheets

METHOD AND APPARATUS FOR IMPROVING COORDINATE ACCURACY OF A TOUCH PANEL

CROSS REFERENCE TO RELATED APPLICATION

The present application is based upon and claims priority to Chinese Patent Application No. 201410015001.3 filed on Jan. 13, 2014, the entire contents of which are incorporated herein by reference.

TECHNICAL FIELD

The present disclosure generally relates to coordinate calculation of a touch panel, in particular, to a method and an apparatus for improving coordinate accuracy of a touch panel. Specially, the disclosure is related to a method and apparatus for introducing a novel method to accurately resolve the coordinate accuracy problem when the coordinate is implemented in a touch panel.

BACKGROUND OF THE RELATED ART

At present, weighted average methods are usually used in coordinate calculation of a touch panel. Such a calculation technique has already been able to meet accuracy requirements in various applications in the touch panel industry. However, when a touch position is close to edges of a touch panel, the conventional calculation methods might cause errors in that this calculation method simply justifies the actual touch position (coordinate) with easy calculation, such that false information is processed and inaccurate response is activated.

Figure 5:
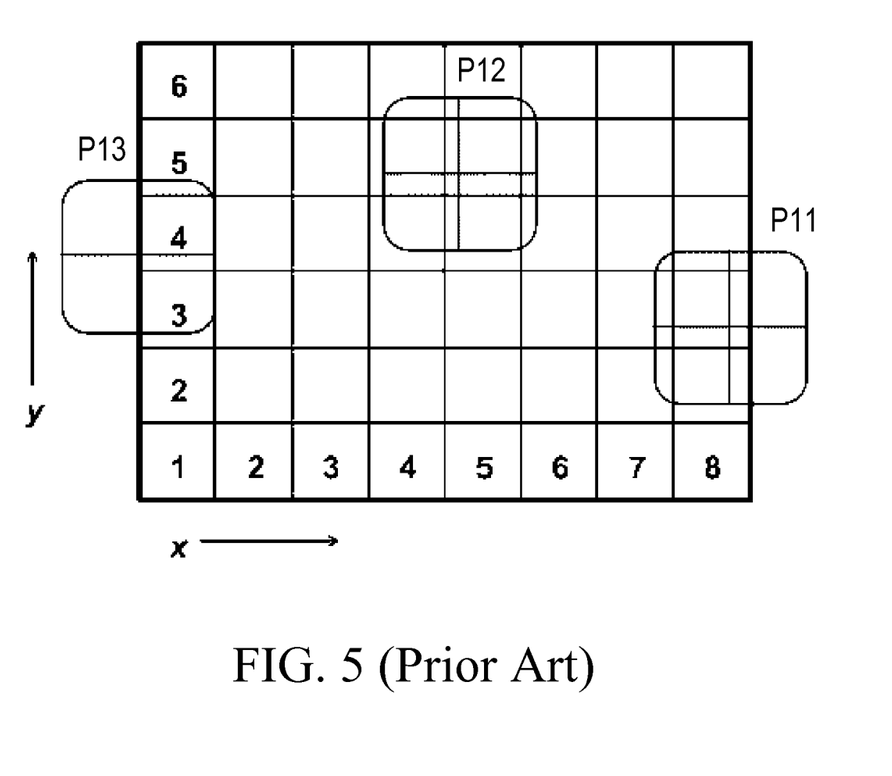
FIG. 5 shows an example of a conventional touch panel calculating method used in a situation where a touch of a user is detected.

FIG. 5 illustratively shows an example of a conventional touch panel calculating method used in a situation where a touch of a user is detected. Taking a sensor array of six rows and eight columns as an example, P11, P12 and P13 respectively represent three touch points, a center of a cross line in each point represents an actual position of each touch, and a range surrounded by a solid-line box represents a touch sensing range.

According to the well-known coordinate calculating methods, taking x coordinates as an example, the x coordinates of the three points P11, P12 and P13 are calculated as follows:

$$x \text{ coordinate of } P11 \text{ (}P11 \text{ involves an edge touch point)} = \frac{7 \cdot 0.25 + 8 \cdot 1}{0.25 + 1} - 0.5 = 7.3;$$

actually P11 (involving an edge point) has an x coordinate of 7.75, where 7 and 8 are respectively system generated coordinates.

$$x \text{ coordinate of } P12 \text{ (}P12 \text{ involves no edge point)} = \frac{4 \cdot 0.75 + 5 \cdot 1 + 6 \cdot 0.25}{0.75 + 1 + 0.25} - 0.5 = 4.25;$$

and an actual x coordinate for P12 is 4.25, where 4, 5 and 6 are respectively system generated coordinates.

$$x \text{ coordinate of } P13 \text{ (}P13 \text{ involves edge point)} = \frac{1 \cdot 1}{1} - 0.5 = 0.5,$$

where 1 represents system generated coordinate; and actually P13 has an x coordinate of 0.

It is seen from the above calculation that for a touch involving no edge(s), i.e. P12, the difference between the x coordinate calculated by the conventional calculation method and the actual x coordinate is relatively small, while for edge touch points, i.e. P11 and P13, the difference between the x coordinate calculated by the conventional calculation method and the actual x coordinate is relatively big.

When a coordinate of a touch point is calculated using the conventional weighted average methods, touch signals of at least three sensing lines are needed so as to determine the coordinate. However, for a touch point located at the edge of the touch panel, only two sensing lines caused by the user's touch may be detected. If the coordinate is calculated using the touch signals of only two sensing lines (described in the background of the present disclosure), erroneous information indicating where the touch point is actually located may be presented.

Methods for calculating y coordinates in conventional technologies are similar to the methods for calculating x coordinates. Likewise, for a touch point involving edge(s), the difference between y coordinates calculated by the conventional calculation method and the actual y coordinate is relatively big.

SUMMARY OF THE INVENTION

In accordance with one aspect of the present invention, it is to be noted that the method of the preferred embodiment of the present disclosure requires a comparison among signal strengths of three sensing lines caused by the user's touch so as to precisely pinpoint the user's touch to avoid the possibly inaccurate response.

In order to solve the above problems, the present disclosure provides a method and an apparatus for improving coordinate accuracy of a touch panel, which are capable of increasing accuracy of a point detection in a touch panel.

According to a first aspect of the embodiments of the present disclosure, there provides a method for improving coordinate accuracy of a touch panel, wherein the touch panel includes M sensing lines $L_1, L_2, \ldots,$ and $L_M$ which are arranged along a direction, wherein $L_1$ and $L_M$ (the very first sensing line and the very last sensing line) are edge sensing lines. Each of the sensing lines as well as the edge sensing lines is defined with a system generated coordinate and the method includes the steps of:

detecting existence of a touch point influencing at least one sensing line;

detecting signal strengths of the at least one sensing line and of a sensing line immediately adjacent to the at least one sensing line;

determining existence of an edge sensing line;

generating a virtual sensing line immediately adjacent to the at least one sensing line and sandwiching the at least one sensing line with a sensing line immediately adjacent to the at least one sensing line when the existence of the edge sensing line is confirmed;

providing a signal strength to the virtual sensing line in response to a result of a signal difference between the at least one sensing line and the sensing line immediately adjacent to the at least one sensing line; and obtaining an actual coordinate of the touch point by weighing coordinates of the at least one sensing line, the immediately adjacent sensing line and the virtual sensing line via system generated coordinates.

According to a second aspect of embodiments of the present disclosure, there provides an apparatus for improving coordinate accuracy of a touch panel, wherein the touch panel includes M sensing lines $L_1, L_2, \ldots,$ and $L_M$ which are arranged along a direction, and $L_1$ and $L_M$ are edge sensing lines (the very first one and the very last one). Each of the sensing lines as well as the edge sensing lines is defined with a system generated coordinate and the apparatus includes:

a detecting module configured to detect existence of a touch point influencing at least one sensing line, and detect signal strengths of the at least one sensing line and a sensing line immediately adjacent to the at least one sensing line;

a determining module configured to determine existence of an edge sensing line, generate a virtual sensing line immediately adjacent to the at least one sensing line when the existence of the edge sensing line is confirmed, and provide a signal strength to the virtual sensing line in response to a result of a signal difference between the at least one sensing line and the sensing line immediately adjacent to the at least one sensing line; and a calculation module configured to obtain an actual coordinate of the touch point by weighing coordinates of the at least one sensing line, the sensing line immediately adjacent to the at least one sensing line and the virtual sensing line via system generated coordinates.

According to a third aspect of embodiments of the present disclosure, there provides a non-transitory storage medium having stored therein instructions that cause the apparatus to perform:

detecting existence of a touch point influencing at least one sensing line;

detecting signal strengths of the at least one sensing line and of a sensing line immediately adjacent to the at least one sensing line;

determining existence of an edge sensing line;

generating a virtual sensing line immediately adjacent to the at least one sensing line and sandwiching the at least one sensing line with the sensing line immediately adjacent to the at least one sensing line when the existence of the edge sensing line is confirmed;

providing a signal strength to the virtual sensing line in response to a result of a signal difference between the at least one sensing line and the sensing line immediately adjacent to the at least one sensing line; and obtaining an actual coordinate of the touch point by weighing coordinates of the at least one sensing line, the immediately adjacent sensing line and the virtual sensing line via system generated coordinates.

In the embodiments of the present disclosure, when coordinate of a touch point located at the edge of a touch panel is calculated, a virtual sensing line is provided. Thus, the coordinate can be determined by performing a weighted average on touch signals involving the system generated coordinates of three sensing lines, actual sensing lines and/or a virtual sensing line.

DESCRIPTION OF THE EMBODIMENTS

Figure 1:
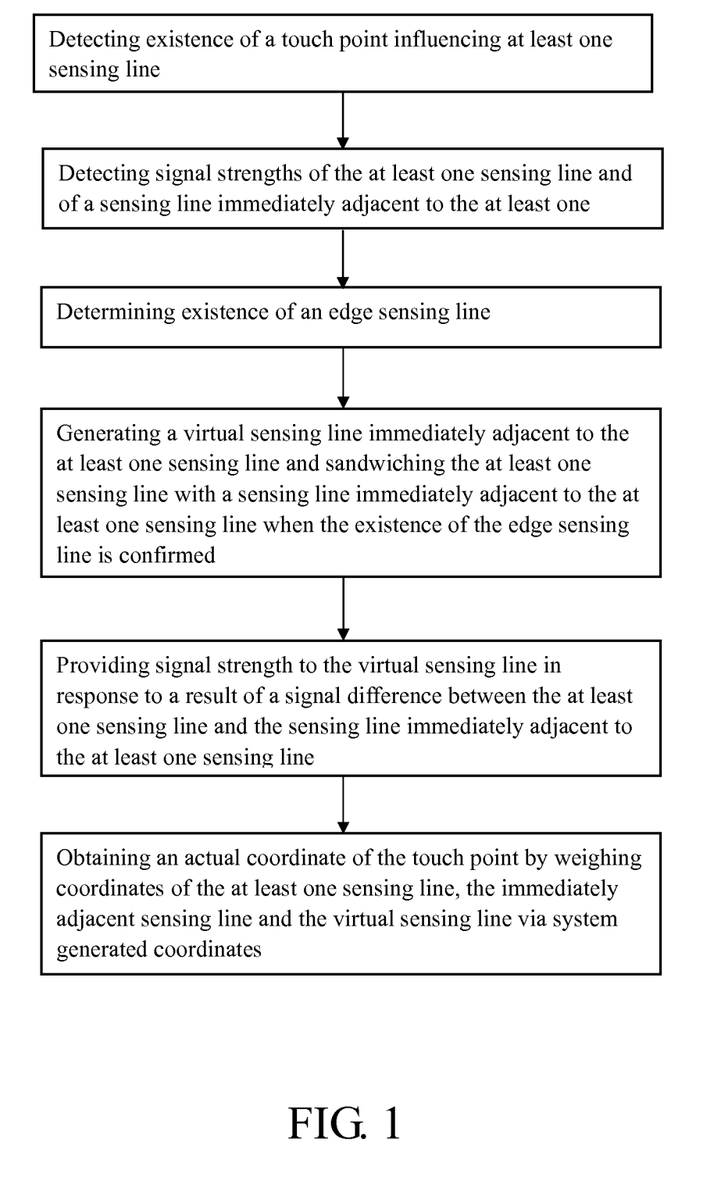
FIG. 1 shows a flowchart of the method for improving coordinate accuracy of a touch panel according to an embodiment of the present disclosure.
Figure 2:
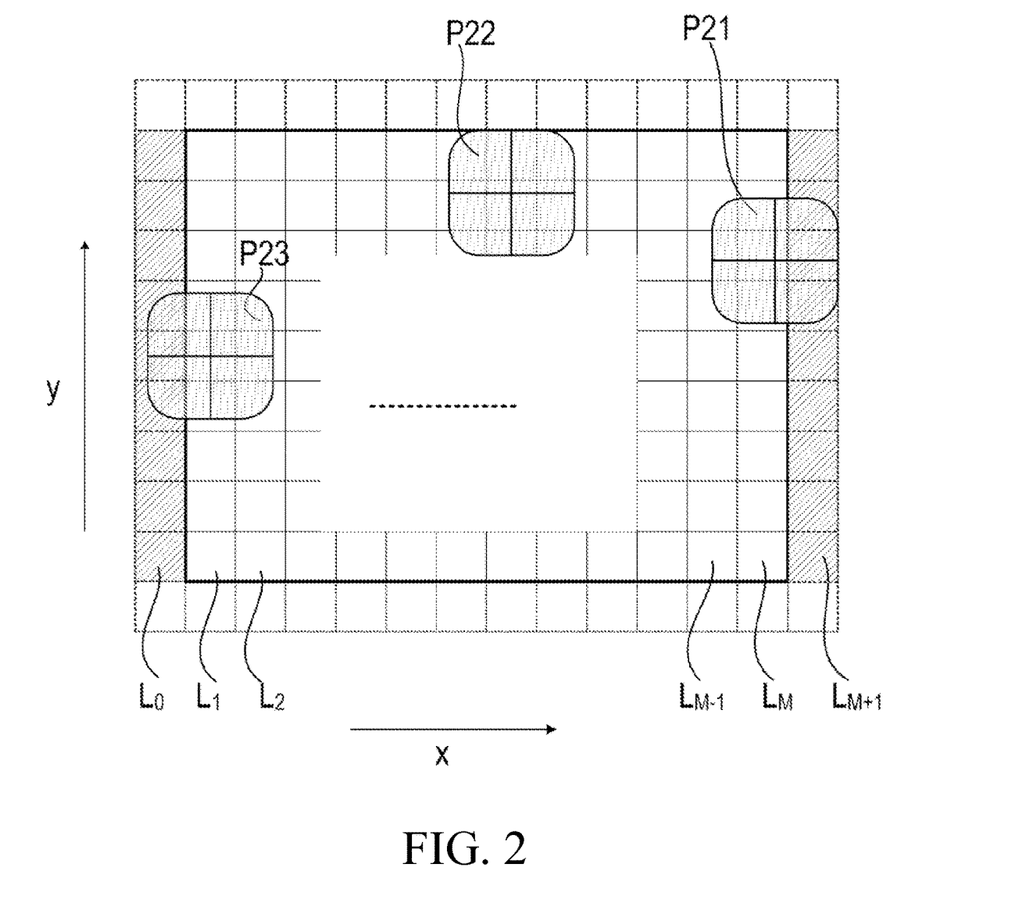
FIG. 2 shows a schematic diagram of a touch panel involved in the embodiments of the present disclosure.

With reference to FIGS. 1 and 2, a touch panel involved in embodiments of the present disclosure is depicted. The touch panel includes M sensing lines $L_1, L_2, \ldots,$ and $L_M$ arranged along a direction (for example, along the x-axis direction), and $L_1$ and $L_M$ (the very first sensing line and the very last sensing line) are edge sensing lines. P21, P22 and P23 respectively represent three touch points, a cross at center of each touch point represents an actual position of each touch, and a range surrounded by a box represents a sensing range caused by the touch. Before actually exercising the theory of the present disclosure, each of the steps involved in the present disclosure is described in detail in the following.

When a user touches the touch panel of the present embodiment to create an effective sensing area which affects at least one sensing line, i.e., two sensing lines, a control circuit (not shown) of the touch panel detects a capacitive variation caused by the touch. To precisely pinpoint the location of the touch so as to trigger the consequent reactions, it is first necessary to ensure that the touch is within the area of the touch panel. After the user's touch is actually confirmed within the touch panel, the control circuit automatically provides signal strength to each of the at least one sensing line(s) (two sensing lines) influenced by the touch within the effective sensing area. As the signal strength provided to the at least one influenced sensing line close to a center of the touch is stronger than those away from the center of the touch in that the touch center causes the greatest capacitive change. This theory is well known in the art and not the focus of this application, detailed description of why the touch center has the strongest signal strength is omitted for brevity. In sum, the farther away from the touch center, the weaker the signal strength is. It is noted that wherever the touch is located, as long as the touch is within the area of the touch panel, at least two sensing lines are involved, even the touch is located at the peripheral area (edge) of the touch panel. Then, there are at least two sensing lines involved as a consequence of the user's touch. As described earlier, each sensing line involved has signal strength. Comparing the two signal strengths of the two sensing lines provides clear picture of which sensing line has the strongest signal strength. Again, the control circuit will determine whether there is an edge sensing line involved due to the user's touch. As described in the background of the present disclosure, providing each sensing line with a system generated coordinate is conventional and not the focus of this application, detailed description thereof is omitted for brevity. Nevertheless, after the system generated coordinate is provided to the involved sensing line(s), the control circuit automatically senses whether there is an edge sensing line involved in the user's touch. As a result of this conclusion, it is noted that the control circuit is able to detect whether the user's touch involves an edge sensing line. That is, after signal strength is provided to the involved sensing line(s)

and when one involved sensing line having the strongest signal strength is aligned with the system previously defined edge (system generated coordinate), it is then determined that the touch is at the touch panel edge. This involved sensing line is then called "edge sensing line".

When the existence of an edge sensing line is confirmed due to the user's touch on the touch panel of the present disclosure, the control circuit automatically provides a virtual sensing line which extends out the touch panel area to meet the requirement of three sensing lines to determine the precise location of the user's touch in accordance with one aspect of the present disclosure. It is to be noted that the provided virtual sensing line is immediately adjacent to and sandwiching the edge sensing line with a sensing line immediately adjacent to the edge sensing line and located within the touch panel area. After the virtual sensing line is provided (created), a virtual signal strength is provided to the virtual sensing line. The provided virtual signal strength is in response to the difference between the signal strength of the edge sensing line and the signal strength of the sensing line immediately adjacent to the edge sensing line. That is, supposing the signal strength of the edge sensing line is "1" and the signal strength of the sensing line immediately adjacent to the edge sensing line within the touch panel is "0.7", the virtual signal strength of the virtual sensing line is "0.3".

With reference to FIG. 2, to further understand the practice of the present disclosure, it is necessary to use examples depicted in the accompanying drawings. In an embodiment of the present disclosure, if the center of a touch point (such as P23) is located at the sensing line $L_1$ and the sensing line $L_2$ immediately adjacent to the sensing line $L_1$ is also required according to the previous description. From the drawing, it is clearly determined that the sensing line $L_1$ is the edge sensing line and has the stronger signal strength when compared with the signal strength of the sensing line $L_2$. As a result of this comparison and to meet the requirement of three sensing lines are required to precisely locate the coordinate of the user's touch, a virtual sensing line $L_0$ is created by the system to sandwich the edge sensing line $L_1$ with the sensing line $L_2$.

Taking P21 for example, when the center of a user's touch is located at the sensing line $L_M$, the sensing line $L_{M-1}$ is also included due to the effective sensing area. After comparison of the signal strength between the sensing line $L_M$ and the sensing line $L_{M-1}$, it is determined that the sensing line $L_M$ has the stronger signal strength and is an edge sensing line. Due to requirement of three sensing line criteria s, a virtual sensing line $L_{M+1}$ on the right side of the edge sensing line $L_M$ is created to sandwich the edge sensing line $L_M$ with the sensing line $L_{M-1}$.

In ideal situations, signal strength so provided is in linear proportion to an effective sensing area. Taking point P21 for example, the effective touch area on the sensing line $L_{M+1}$ plus the effective touch area on the sensing line $L_{M-1}$ equals the effective touch area of the edge sensing line $L_M$. Thus, signal strength $S_M$ of the edge sensing line $L_M$ is equal to the sum of signal strength $S_{M+1}$ sensed by the virtual sensing line $L_{M+1}$ and signal strength $S_{M-1}$ sensed by the sensing line $L_{M-1}$, i.e., $S_{M-1}+S_{M+1}=S_M$. From this formula, it can be determined that the virtual signal strength sensed by the sensing line $L_{M+1}$ is $S_M-S_{M-1}$. Similarly, it can be determined that the virtual signal strength sensed by the sensing line $L_0$ is $S_1-S_2$.

However, for some touch panels, signal strength sensed by a sensing line is not necessarily linearly proportional to the effective touch area. Thus, a correction coefficient R for adjustment is introduced to the previously introduced formula to adapt to different touch panel designs. After the correction coefficient is introduced, it can be learned that the virtual signal strength provided to the virtual sensing line $L_{M+1}$ is $R \cdot S_M - S_{M-1}$, preferably, R may range from 0.5 to 1.5. Similarly, it can be learned that the virtual signal strength provided to the virtual sensing line $L_0$ is $R \cdot S_1 - S_2$.

After having the signal strength relationship, a weighted coordinate formula previously introduced in the background may be adopted and modified into the following formula. Specifically, for example, if the touch point is located at the sensing line $L_1$, the coordinate of the touch point may be calculated by the following formula (1):

$$X = \frac{x_0 \cdot (R \cdot S_1 - S_2) + x_1 \cdot S_1 + x_2 \cdot S_2}{(S_1 - S_2) + S_1 + S_2} - 0.5 \qquad (1)$$

where $x_0$ is a coordinate (system generated coordinate) of the virtual sensing line $L_0$, $x_1$ is a coordinate of the sensing line $L_1$, $x_2$ is a coordinate of the sensing line $L_2$, and X is an x-axis coordinate of the edge touch point.

If the touch point is located at the sensing line $L_M$, the coordinate of the touch point may be calculated by the following formula (2):

$$X = \frac{x_{M-1} \cdot S_{M-1} + x_M \cdot S_M + x_{M+1} \cdot (R \cdot S_M - S_{M-1})}{S_{M-1} + S_M + (S_M - S_{M-1})} - 0.5 \qquad (2)$$

where $x_{M-1}$ is a coordinate of the sensing line $L_{M-1}$, $x_M$ is a coordinate of the sensing line $L_M$, and $x_{M+1}$ is a coordinate of the sensing line $L_{M+1}$.

The method of the present disclosure will be described below by a specific example.

Figure 3:
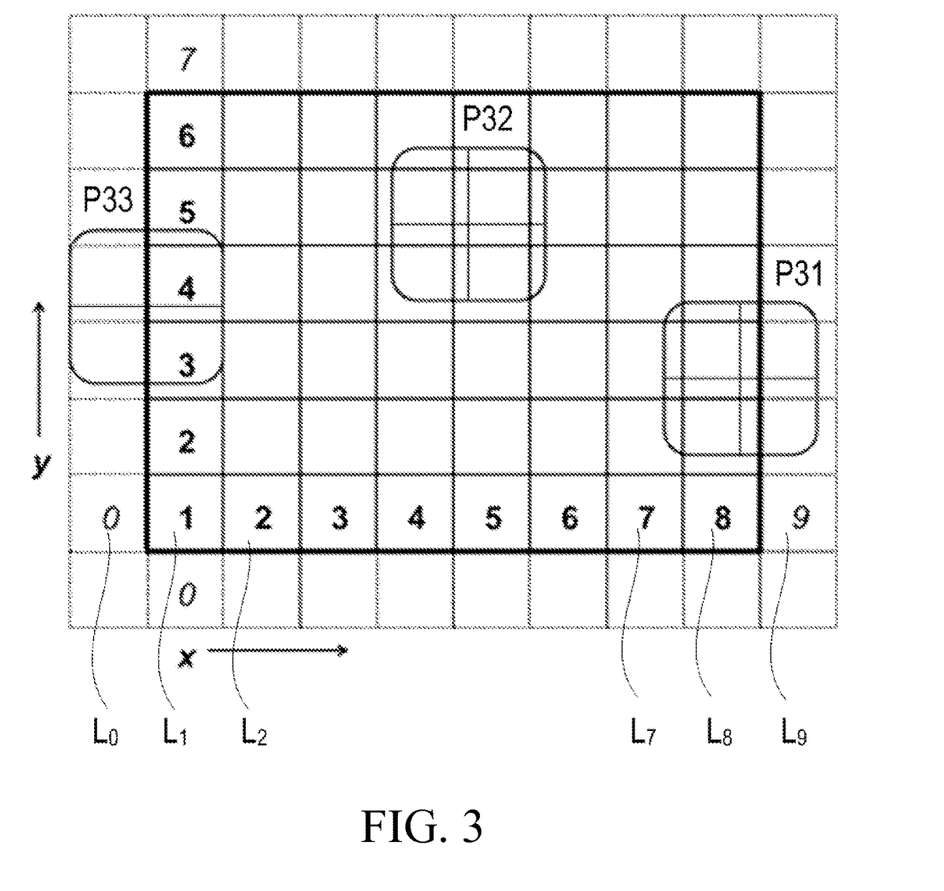
FIG. 3 shows an example of a touch panel involved in the embodiments of the present disclosure.

FIG. 3 illustratively shows the implementation of the method involved in embodiments of the present disclosure. FIG. 3 shows a 6×8 sensor array, which includes eight sensing lines arranged along the x direction and six sensing lines arranged along the y direction. P31, P32 and P33 respectively represent three touch points, a central cross line in each of the touch point represents an actual position of each touch, and a range surrounded by a solid-line box represents the effective sensing area.

For a touch point having the central cross line located elsewhere except the edge of the touch panel (such as P32), well known weighted average methods may be employed. For example, coordinates of sensing lines $L_4$, $L_5$ and $L_6$ within a touch sensing area of P32 are 4, 5 and 6 respectively, and the sensed signal strengths are 0.75, 1 and 0.25 respectively, and then an x coordinate of P32 is calculated as $$\frac{4 \cdot 0.75 + 5 \cdot 1 + 6 \cdot 0.25}{0.75 + 1 + 0.25} - 0.5 = 4.25.$$

For the touch point P33 on the left side of the touch panel, which involves the edge sensing line $L_1$, the signal strength, i.e., 1 provided to the sensing line $L_1$ within the effective sensing area of the touch point P33 and the signal strength, i.e., 0 provided to the sensing line $L_2$ within the effective sensing area of the edge touch point P33 are obtained, and then a virtual coordinate 0 and a virtual signal strength (1−0) for the virtual sensing line $L_0$ are obtained. In the present embodiment, it is assumed that R=1.

Respective signal strength and coordinates obtained above are introduced into formula (1) and then the x coordinate of the touch point P33 is $$\frac{0 \cdot (1-0) + 1 \cdot 1 + 2 \cdot 0}{(1-0) + 1 + 0} - 0.5 = 0.$$

This x coordinate is the same as the actual position (which is 0) of P33.

For the touch point P31 on the right side of the touch panel, still taking the calculation of x coordinate as an example, signal strength, for example, 0.25, is provided to the sensing line $L_7$ and signal strength, for example, 1, is provided to the sensing line $L_8$. In order to meet the three-sensing-line requirement to pinpoint the actual location of the user's touch, a virtual sensing line, $L_9$, is generated and a virtual signal strength (1−0.25) for the virtual sensing line $L_9$ is thus created. In the present embodiment, it is assumed that R=1.

Respective signal strength and coordinates obtained above are introduced into formula (2) and then the x coordinate of the touch point P31 is $$\frac{7 \cdot 0.25 + 8 \cdot 1 + 9 \cdot (1-0.25)}{0.25 + 1 + (1-0.25)} - 0.5 = 7.75.$$

This x coordinate is the same as the actual position (which is 7.75) of P31.

By comparing x coordinates calculated using the method provided by embodiments of the present disclosure with x coordinates calculated using the weighted average methods, it can be seen that the x coordinates of touch points calculated using the method provided by embodiments of the present disclosure and involving an edge sensing line are consistent with actual x coordinates of these points and accuracies of the x coordinates are improved.

The calculation of y coordinates is similar to that of the x coordinate and accuracies of the y coordinates may be improved as well.

The reason why the method provided by the embodiments of the present disclosure is capable of improving accuracies of the edge coordinates of a touch panel will be explained below.

When a coordinate of a touch point is calculated using the weighted average method, touch signals of three sensing lines are needed to determine the coordinate. However, for a touch point involving an edge sensing line, touch signals of only two sensing lines may be obtained. If the coordinate is calculated using the touch signals of these two sensing lines (see the calculation method provided in the background of the present disclosure), the calculated coordinate will be relatively smaller than the actual coordinate.

In the embodiments of the present disclosure, when a coordinate of a touch point is calculated, a virtual sensing line is extended outward. Thus, the coordinate may be determined by performing a weighted average on touch signals of three sensing lines. Furthermore, based on an area relationship of a touch influencing an effective sensing area and involving three sensing lines, a virtual signal strength of the virtual sensing line is determined. For example, if an edge point is located at the sensing line $L_1$, a virtual signal strength of virtual sensing line $L_0$ is determined as $R \cdot S_1 - S_2$, and if the edge touch point is located on sensing line $L_M$, a virtual signal strength of the virtual sensing line $L_{M+1}$ is determined as $R \cdot S_M - S_{M-1}$. Thus, the calculated coordinate for the user's touch is accurate.

In addition, using the correction coefficient R to adjust the virtual signal strength may make the calculated coordinates adapt to different touch panel designs and thereby further improving coordinate accuracy.

Figure 4:
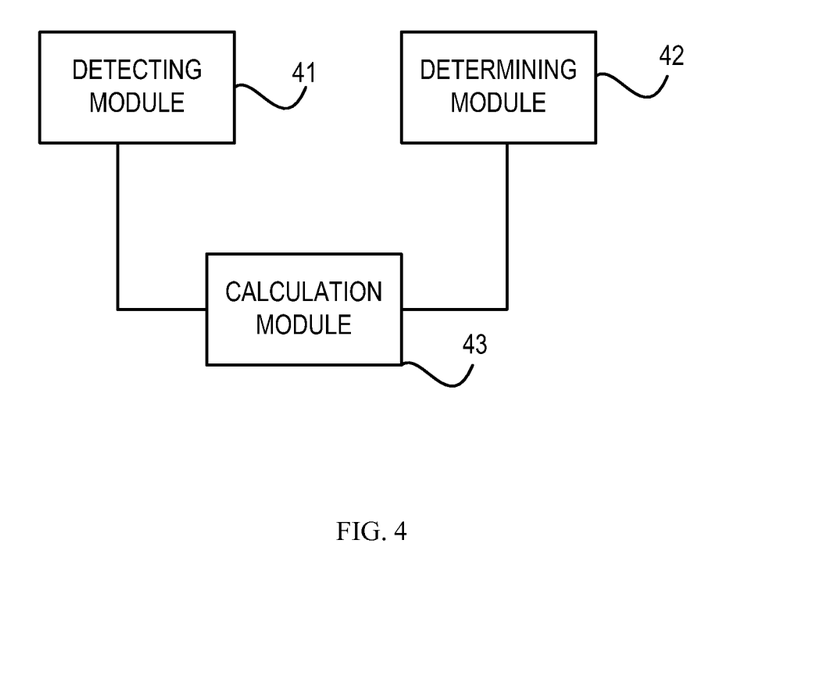
FIG. 4 shows a schematic diagram of an apparatus for improving coordinate accuracy of a touch panel according to an embodiment of the present disclosure.

FIG. 4 illustratively shows a schematic diagram of an apparatus for improving coordinate accuracy of a touch within a touch panel according to an embodiment of the present disclosure. The touch panel includes M sensing lines $L_1, L_2, \ldots,$ and $L_M$ which are arranged along a direction, and $L_1$ and $L_M$ are edge sensing lines. The apparatus includes a detecting module 41, a determining module 42 and a calculation module 43. The detecting module 41 is configured to detect existence of a touch point influencing at least one sensing line, and detect signal strengths of the at least one sensing line and an a sensing line immediately adjacent to the at least one sensing line. The determining module 42 is configured to determine whether the at least one sensing line is an edge sensing line, generate a virtual sensing line immediately adjacent to the at least one sensing line if the at least one sensing line is actually the edge sensing line, and provide a virtual signal strength to the virtual sensing line in response to a result of a signal difference between the at least one sensing line and the sensing line immediately adjacent to the at least one sensing line. The calculation module 43 is connected with the detecting module 41 and the determining module 42 and is configured to obtain an actual coordinate of the touch point by weighing coordinates of the at least one sensing line, the sensing line immediately adjacent to the at least one sensing line and the virtual sensing line via system generated coordinates.

If the edge touch point is located at the sensing line $L_1$ and the sensing lines within the effective sensing area of the touch include $L_1$ and $L_2$, the virtual sensing line is $L_0$, and the virtual signal strength obtained by the determining module is $R \cdot S_1 - S_2$.

If the edge touch point is located at the sensing line $L_M$ and the sensing lines within the effective sensing area of the touch include $L_{M-1}$ and $L_M$, the virtual sensing line is $L_{M+1}$, and the virtual signal strength is $R \cdot S_M - S_{M-1}$.

According to an embodiment of the present disclosure, the apparatus for improving coordinate accuracy of a touch panel may be implemented by a processing unit (for example, a Central Processing Unit (CPU)) in devices having a touch panel, such as mobile devices, notebook computers or desktop computers. The method for improving coordinate accuracy of a touch panel provided by embodiments of the present disclosure may be implemented by means of software, for example, may be written as firmware which may be stored in storing modules of a device having a touch panel. When executed, the firmware may cause the processing unit to perform the method provided in the present disclosure. That is to say, the present disclosure may be implemented by means of a non-transitory storage medium having stored therein instructions that, when executed by one or more processors of an apparatus for improving edge coordinate accuracy of a touch panel, causes the apparatus to perform:

detecting existence of a touch point influencing at least one sensing line;

detecting signal strengths of the at least one sensing line and a sensing line immediately adjacent to the at least one sensing line;

determining existence of an edge sensing line;

generating a virtual sensing line immediately adjacent to the at least one sensing line when the existence of the edge sensing line is confirmed;

providing a signal strength to the virtual sensing line responsive to a signal difference between the at least one sensing line and the sensing line immediately adjacent to the at least one sensing line; and obtaining an actual coordinate of the touch point by weighing coordinates of the at least one sensing line, the sensing line immediately adjacent to the at least one sensing line and the virtual sensing line via system generated coordinates.

Although the present invention has been described with reference to typical embodiments, it should be understood that the terminologies herein are for illustration purposes rather than to limit the present invention. The present invention can be implemented in many specific embodiments without departing from the spirit and scope of the present invention, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A method for improving coordinate accuracy of a touch panel having sensing lines so arranged to form an array, wherein a very first sensing line and a very last sensing line are edge sensing lines, and each of the sensing lines as well as the edge sensing lines is defined with a system generated coordinate, the method comprising the steps of:

detecting existence of a touch point influencing at least one sensing line;

determining existence of an edge sensing line;

providing signal strengths to the at least one sensing line and a sensing line immediately adjacent to the at least one sensing line;

generating a virtual sensing line immediately adjacent to the at least one sensing line and extending out the touch panel if the existence of the edge sensing line is confirmed, wherein the virtual sensing line has a signal strength responsive to a result of signal difference between the at least one sensing line and the sensing line immediately adjacent to the at least one sensing line; and obtaining an actual coordinate of the touch point by weighing coordinates of the at least one sensing line, the sensing line immediately adjacent to the at least one sensing line and the virtual sensing line via system generated coordinates, wherein the at least one sensing line is provided with a signal strength $S_1$ and the sensing line immediately adjacent to the at least one sensing line is provided with a signal strength $S_2$, the virtual sensing line has a virtual si snail strength $R \cdot S_1 - S_2$, where R is a correction coefficient.

2. The method as claimed in claim 1, wherein the actual coordinate of the touch point is defined as:

$$\frac{x_0 \cdot (R \cdot S_1 - S_2) + x_1 \cdot S_1 + x_2 \cdot S_2}{(S_1 - S_2) + S_1 + S_2} - 0.5,$$

where $x_0$ is the system generated coordinate of the virtual sensing line, $x_1$ is the system generated coordinate of the at least one sensing line, and $x_2$ is the system generated coordinate of the sensing line immediately adjacent to the at least one sensing line.

3. The method as claimed in claim 2, wherein R ranges from 0.5~1.5.

4. The method as claimed in claim 1, wherein in the edge sensing line existence determination step, when the system generated coordinate of the at least one sensing line which has the higher signal strength after compared with the sensing line immediately adjacent to the at least one sensing line is aligned with the edge sensing line, the at least one sensing line is the edge sensing line.

5. The method as claimed in claim 4, wherein R ranges from 0.5~1.5.

6. The method as claimed in claim 1, wherein R ranges from 0.5~1.5.

7. The method as claimed in claim 6, wherein R ranges from 0.5~1.5.

8. An apparatus for improving coordinate accuracy of a touch panel having sensing lines so arranged to form an array, wherein a very first sensing line and a very last sensing line are edge sensing lines, and each of the sensing lines as well as the edge sensing lines is defined with a system generated coordinate, the apparatus comprising:

a processing unit; and a storing module for storing instructions executable by the processing unit, wherein the processing unit is configured to;

detect existence of a touch point influencing at least one sensing line, and provide signal strengths to the at least one sensing line and a sensing line immediately adjacent to the at least one sensing line;

determine existence of an edge sensing line, generate a virtual sensing line extending out of the touch panel after the edge sensing line existence is confirmed, and provide a signal strength to the virtual sensing line responsive to a result of signal difference between the at least one sensing line and the sensing line immediately adjacent to the at least one sensing line; and obtain an actual coordinate of the touch point by weighing coordinates of the at least one sensing line, the sensing line immediately adjacent to the at least one sensing line and the virtual sensing line via system generated coordinates, wherein the at least one sensing line is provided with a signal strength $S_1$ and the sensing line immediately adjacent to the at least one sensing line is provided with a signal strength $S_2$, the virtual sensing line has a virtual signal strength $R \cdot S_1 - S_2$, where R is a correction coefficient.

9. The apparatus as claimed in claim 8, wherein coordinate of the touch point is defined as:

$$\frac{x_0 \cdot (R \cdot S_1 - S_2) + x_1 \cdot S_1 + x_2 \cdot S_2}{(S_1 - S_2) + S_1 + S_2} - 0.5,$$

where $x_0$ is the system generated coordinate of the virtual sensing line, $x_1$ is the system generated coordinate of the at least one sensing line, and $x_2$ is the system generated coordinate of the sensing line immediately adjacent to the at least one sensing line.

10. The apparatus as claimed in claim 9, wherein R ranges from 0.5~1.5.

11. The apparatus as claimed in claim 8, wherein when the system generated coordinate of the at least one sensing line which has the higher signal strength after compared with the sensing line immediately adjacent to the at least one sensing line is aligned with the edge sensing line, the at least one sensing line is the edge sensing line.

12. The apparatus as claimed in claim 11, wherein R ranges from 0.5~1.5.

13. The apparatus as claimed in claim 8, wherein R ranges from 0.5~1.5.

14. The apparatus as claimed in claim 13, wherein R ranges from 0.5~1.5.

15. A method for improving coordinate accuracy of a touch panel having sensing lines so arranged to form an x×y array, wherein a very first sensing line and a very last sensing line are edge sensing lines, and each of the sensing lines as well as the edge sensing lines is defined with a system generated coordinate, the method comprising the steps of:
   detecting existence of a touch point influencing at least one sensing line;
   determining existence of an edge sensing line;
   providing signal strengths to the at least one sensing line and a sensing line immediately adjacent to the at least one sensing line;
   generating a virtual sensing line (x+1 or y+1) immediately adjacent to the at least one sensing line and extending out the touch panel if the existence of the edge sensing line is confirmed, wherein the virtual sensing line has a signal strength responsive to a result of signal difference between the at least one sensing line and the sensing line immediately adjacent to the at least one sensing line; and
   obtaining an actual coordinate of the touch point by weighing coordinates of the at least one sensing line, the sensing line immediately adjacent to the at least one sensing line and the virtual sensing line via system generated coordinates,
   wherein the at least one sensing line is provided with a signal strength $S_1$ and the sensing line immediately adjacent to the at least one sensing line is provided with a signal strength $S_2$, the virtual sensing line has a virtual signal strength $R \cdot S_1 - S_2$, where R is a correction coefficient.

16. The method as claimed in claim 15, wherein the actual coordinate of the touch point is defined as:

$$\frac{x_0 \cdot (R \cdot S_1 - S_2) + x_1 \cdot S_1 + x_2 \cdot S_2}{(S_1 - S_2) + S_1 + S_2} - 0.5,$$

where $x_0$ is the system generated coordinate of the virtual sensing line, $x_1$ is the system generated coordinate of the at least one sensing line, and $x_2$ is the system generated coordinate of the sensing line immediately adjacent to the at least one sensing line.

17. The method as claimed in claim 15, wherein in the edge sensing line existence determination step, when the system generated coordinate of the at least one sensing line which has the higher signal strength after compared with the sensing line immediately adjacent to the at least one sensing line is aligned with the edge sensing line, the at least one sensing line is the edge sensing line.

* * * * *